United States Patent [19]

Takeda et al.

[11] Patent Number: 4,508,632

[45] Date of Patent: Apr. 2, 1985

[54] HEAT STORAGE MATERIALS

[75] Inventors: Takeshi Takeda, Kawasaki; Yasuhiko Machida; Yasuo Kudoh, both of Yokohama; Kazutoshi Ikegaya, Kawasaki, all of Japan

[73] Assignee: Matsushita Electric Industrial Co., Ltd., Japan

[21] Appl. No.: 504,601

[22] Filed: Jun. 15, 1983

[30] Foreign Application Priority Data

Jun. 15, 1982 [JP] Japan ................................ 57-103214
Aug. 24, 1982 [JP] Japan ................................ 57-147110

[51] Int. Cl.$^3$ .............................................. C09K 5/06
[52] U.S. Cl. .................................... 252/70; 126/400; 423/413; 423/514; 423/551
[58] Field of Search ........................................... 252/70

[56] References Cited

U.S. PATENT DOCUMENTS

| 4,209,413 | 6/1980 | Kent et al. | 252/70 |
| 4,331,556 | 5/1982 | Arrhenius | 252/70 |
| 4,400,286 | 8/1983 | Schaper et al. | 252/70 |

FOREIGN PATENT DOCUMENTS 2753598  6/1979  Fed. Rep. of Germany ........ 252/70

Primary Examiner—Paul Lieberman
Assistant Examiner—Robert A. Wax
Attorney, Agent, or Firm—Lowe, King, Price & Becker

[57] ABSTRACT

A heat storage material is described which comprises a mixture of sodium sulfate decahydrate or sodium thiosulfate pentahydrate, and urea. The mixing ratio by mole of the sulfate decahydrate to urea is in the range of 1:1 to 1:3 and the mixing ratio by mole of the thiosulfate pentahydrate to urea is in the range of 1:2 to 1:8.

5 Claims, 2 Drawing Figures

HEAT STORAGE MATERIALS

BACKGROUND OF THE INVENTION

1. Field of the Invention

This invention relates to the utilization of solar energy and more particularly, to heat storage materials for use in passive solar heating systems.

2. Description of the Prior Art

For heating particularly in the winter, passive solar heating systems have been recently used in which solar heat is stored in the daytime and the stored heat is utilized for heating in the night. As is well known in the art, heat storage materials for use in the system include sodium sulfate decahydrate, $Na_2SO_4.10H_2O$, and calcium chloride hexahydrate, $CaCl_2.6H_2O$. The sulfate decahydrate and the chloride hexahydrate have melting points of 32° C. and 29° C., respectively. These materials are now applied only to passive solar heating systems. In order to enable one to use heat storage materials not only in passive solar heating systems but also in other various ways, it is highly desirable to lower the melting point below 25° C.

In recent years, many studies have been made for saving energy required in greenhouses or vinyl houses. To this end, latent heat storage materials are utilized to store therein solar heat during the daytime so that the stored heat is allowed to release at night for heating the facilities. By the utilization, petroleum which has hitherto been used for heating can be saved to a substantial extent. In ordinary greenhouses which are closed, the indoor temperature in the winter reaches 40° C. or higher during the day in fine weather. In view of the adverse influence on crops, it is customary to ventilate the greenhouse from time to time so that the highest temperature does not exceed 30° C. In order to efficiently accomplish heat storage using as a heat source the air in the greenhouse, which is maintained at a temperature of about 30° C. during a period of 7 to 8 hours in the day, it is necessary that a difference of at least 5° C. be maintained between the temperature of the indoor air serving as a heat source and the melting point of a latent heat storage material. Accordingly, there is a demand for the development of a latent heat storage material whose melting point is below 25° C.

SUMMARY OF THE INVENTION

It is therefore an object of the present invention to provide heat storage materials which have a melting point below 25° C. and particularly ranging from 24° to 17° C.

It is another object of the invention to provide heat storage materials which are inexpensive, non-oxious, and incombustible and are thus useful such as in passive solar heating systems.

The above objects can be achieved, according to the present invention, by a heat storage material which comprises a mixture of sodium sulfate decahydrate, $Na_2SO_4.10H_2O$, or sodium thiosulfate pentahydrate, $Na_2S_2O_3.5H_2O$, and urea, $(NH_2)_2CO$. As will be particularly illustrated hereinafter, the mixing ratio by mole of the sulfate decahydrate or thiosulfate pentahydrate to urea is in the range of 1:1 to 1:3, or 1:2 to 1:8, respectively. needless to say, any other additives which are employed in ordinary hydrate-base latent heat storage materials, e.g. supercooling inhibitors, thickeners for suppressing phase separation, and the like, may be added to the heat storage material of the invention.

DETAILED DESCRIPTION AND PREFERRED EMBODIMENTS OF THE INVENTION

In order to determine melting points of mixtures of sodium sulfate decahydrate or sodium thiosulfate pentahydrate, and urea in different mixing ratios by mole, the following experiment is conducted. About 30 g of each sample is placed in a sealed polyethylene container. A thermocouple is set at the central portion of the sample. This container is immersed in a water tank of 10° C. thereby solidifying the sample. Thereafter, the container is transferred to a hot water tank of 45° C. to measure a temperature profile on fusion. It will be noted that because these mixtures may melt incongruently, 2 wt% of a crosslinking acrylic polymer is added as a phase separation inhibitor along with 3 wt% of borax serving as a supercooling inhibitor. As a matter of course, any additives other than the above-indicated inhibitors may be used. Use of these inhibitors is not essential in the practice of the invention. Similar results are obtained without the use of any additives.

Figure 1:
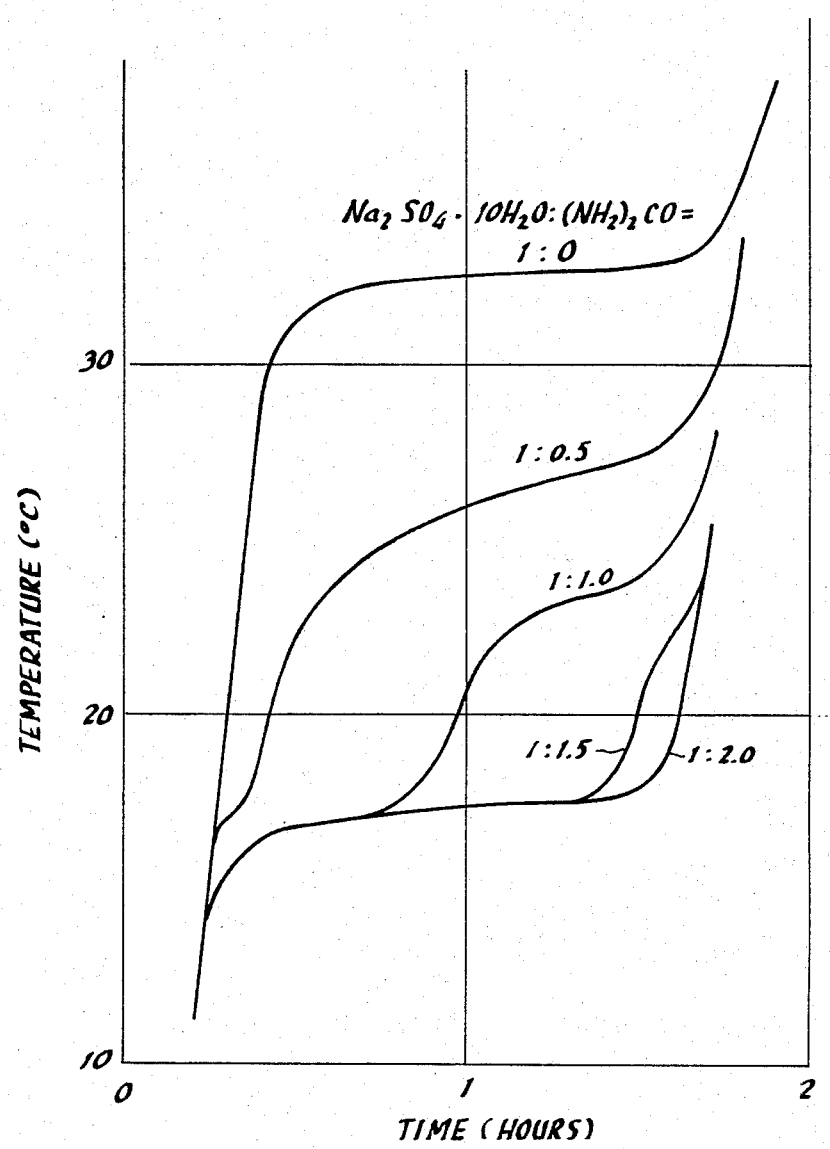
FIG. 1 is a graphical representation of melting profiles of sodium sulfate decahydrate itself and mixtures of sodium sulfate decahydrate and urea in relation to time.

In FIG. 1, there are shown melting curves of sodium sulfate decahydrate itself and mixtures of sodium sulfate decahydrate and urea in different mixing molar ratios.

As will be seen from FIG. 1, when sodium sulfate decahydrate having a melting point of 32° C. is admixed with urea having a melting point of 132° C., the temperature at which fusion is completed decreases with an increase in amount of urea. With a mixture of sodium sulfate decahydrate and urea in a mixing ratio by mole of 1:0.5, its fusion is completed at about 27° C. The melting or fusion curve of the mixture includes a small flat or transition portion at 17° C. When the mixing ratio of urea increases, the transition portion at 17° C. becomes wider with a lowering of the fusion completion temperature. At the same time, another transition protion at a higher temperature becomes narrower. It should be noted that a mixture of sodium sulfate decahydrate and urea in a mixing ratio by mole of 1:2 is an eutectic mixture of single phase having a melting or eutectic point of 17° C. Although not shown in the figure, fusion curves of mixtures having increasing mixing ratios of urea, e.g. mixtures of sodium sulfate decahydrate and urea having mixing ratios by mole of 1:3 and 1:4, reveal that they fuse only at 17° C. within a temperature range from 10° to 30° C. However, the amount of non-fused urea increases and latent heat of fusion becomes as low as below 30-25 cal/g for the sample having a mixture ratio of 1:4. Accordingly, the mixing ratio by mole of the sulfate decahydrate and urea should be below 1:3.

On the other hand, the mixing ratio of urea is not critical with respect to the lower limit. Taking into account requirements for general-purpose passive solar systems such as greenhouses that the fusion completion temperature should be below 25° C., the mixing ratio by mole of the sulfate decahydrate to urea should be 1:1 or higher. That is, the heat storage material of the invention using sodium sulfate decahydrate should have a molar mixing ratio of sodium sulfate decahydrate to urea of 1:1 to 1:3, whereby a fusion completion temperature can be arbitrarily controlled within a range of from 24° to 17° C.

In the above embodiment, sodium sulfate decahydrate is used in combination with urea. The decahydrate may be replaced by sodium thiosulfate pentahydrate with similar results. This is particularly illustrated with reference to FIG. 2.

The temperature profile is determined in the same manner as in the case using the decahydrate.

Figure 2:
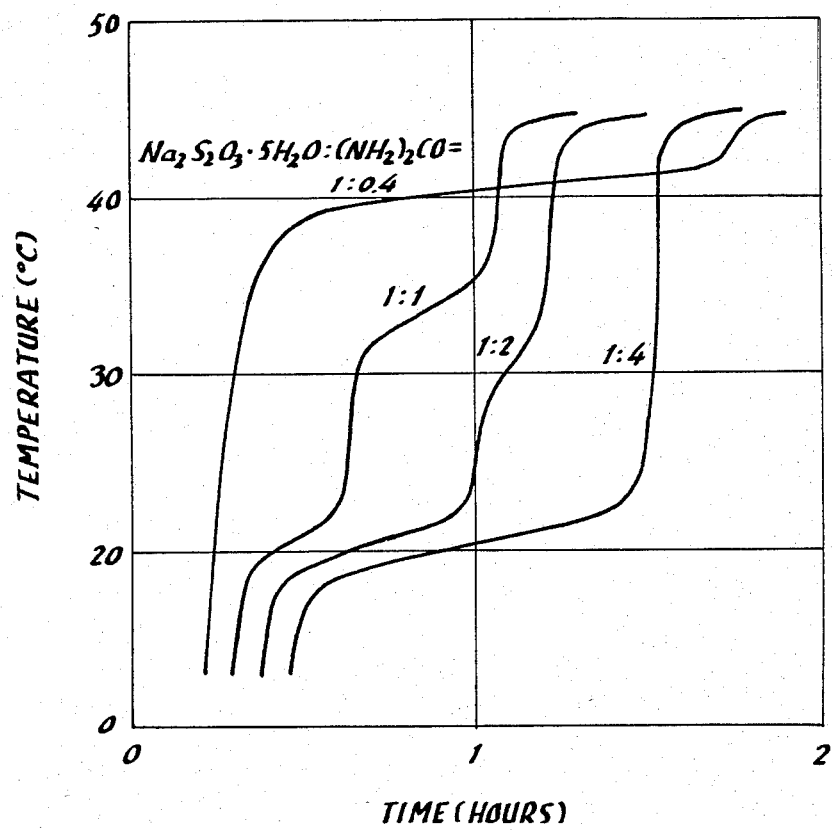
FIG. 2 is similar to FIG. 1 and shows melting curves of mixtures of sodium thiosulfate pentahydrate and urea in different mixing ratios by mole.

As will be seen from FIG. 2, when sodium thiosulfate pentahydrate having a melting point of 48° C. is admixed with urea having a melting point of 132° C., the melting point of the mixture lowers to about 42° C. at a mixing ratio by mole of sodium thiosulfate pentahydrate to urea of 1:0.4. When the mixing ratio is 1:1, the mixture completely fuses at about 35° C. This mixture has a flat or transition portion at 22° to 23° C. as shown in FIG. 2, demonstrating that part of the mixture fuses at 22° to 23° C., so that heat can be stored. As the amount of urea increases, the flat portion becomes wider. At the same time, another flat portion at a higher temperature becomes narrower in width. A mixture of sodium thiosulfate pentahydrate and urea having a mixing ratio by mole of 1:4 is an eutectic mixture of single phase having only a melting or eutectic point of 22° to 23° C. When the mixing ratio exceeds 1:4, the flat portion at 22° to 23° C. again becomes narrower, revealing that the heat storage ability in the temperature range lowers.

Mixtures of sodium thiosulfate pentahydrate and urea in mixing ratios by mole ranging from 1:1 to 1:9 partly or wholly fuse at temperatures below 25° C. Thus, there is a possibility of heat storage in the intended temperature range. However, in view of the latent heat of fusion of these mixture, the mixing ratio by mole on the pentahydrate to urea is favorably in the range of 1:1 to 1:8.

What is claimed is:

1. A heat storage material for use in solar heating systems which consists essentially of a mixture of a sodium salt selected from the group consisting of sodium sulfate decahydrate and sodium thiosulfate pentahydrate, and urea, provided that a mixing ratio by mole of said sodium sulfate decahydrate to said urea is in the range of 1:1 to 1:3 and a mixing ratio by mole of said sodium thiosulfate pentahydrate to said urea is in the range of 1:2 to 1.8.

2. A heat storage material according to claim 1, wherein said sodium salt is sodium sulfate decahydrate.

3. A heat storage material according to claim 1, wherein said sodium salt is sodium thiosulfate pentahydrate.

4. A heat storage material according to claim 1, wherein said heat storage material is an eutectic mixture of sodium sulfate decahydrate and urea having a mixing ratio by mole of 1:2.

5. A heat storage material according to claim 1, wherein said heat storage material is an eutectic mixture of sodium thiosulfate pentahydrate and urea having a mixing ratio by mole of 1:4.

* * * * *